F. R. WARD.
TRACTOR ATTACHMENT FOR AUTOMOBILES.
APPLICATION FILED SEPT. 10, 1917.
1,366,893.
Patented Jan. 25, 1921.
3 SHEETS—SHEET 1.
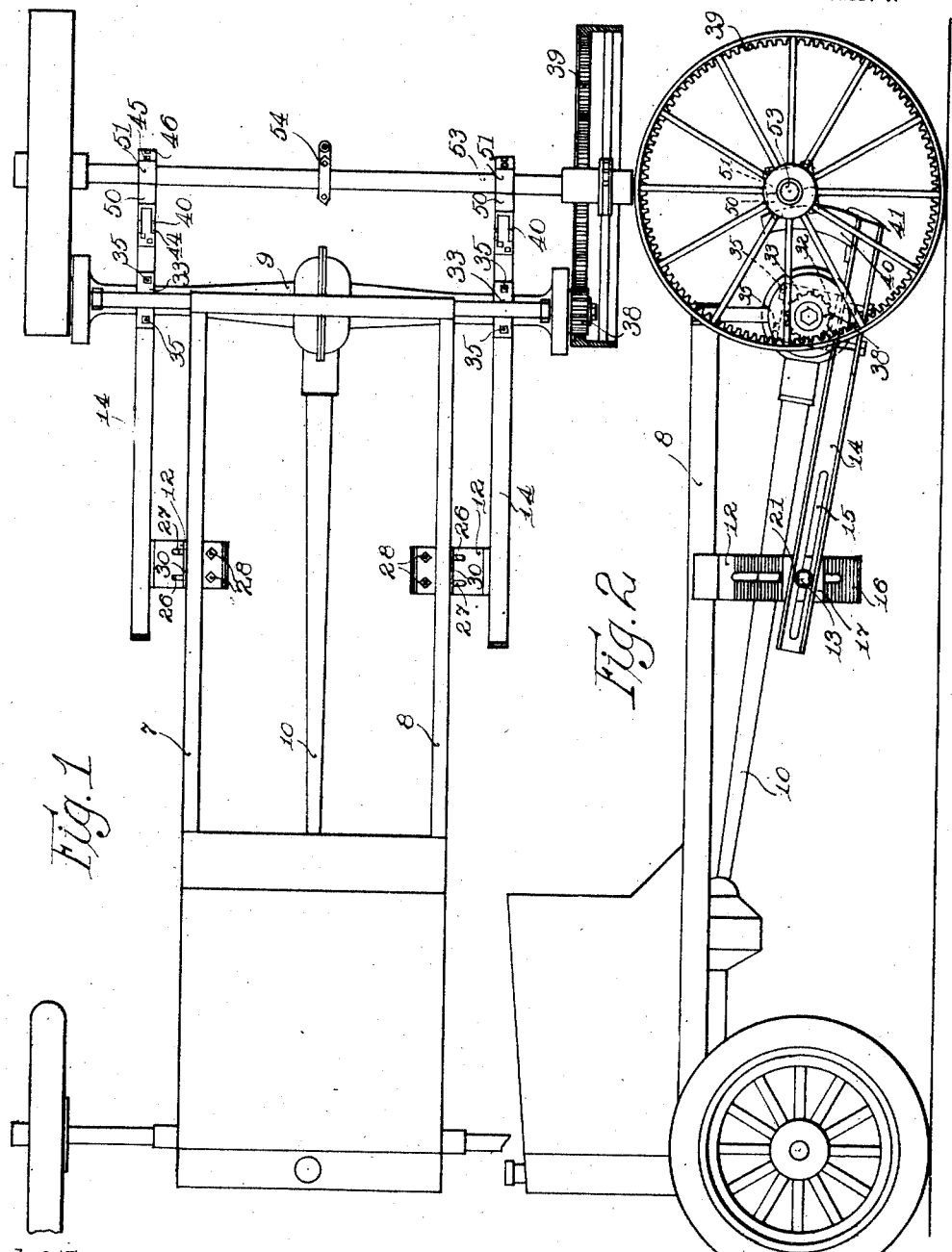
Witnesses:
Inventor
Frank R. Ward.
By Williams Bradbury & Lee
Attorneys

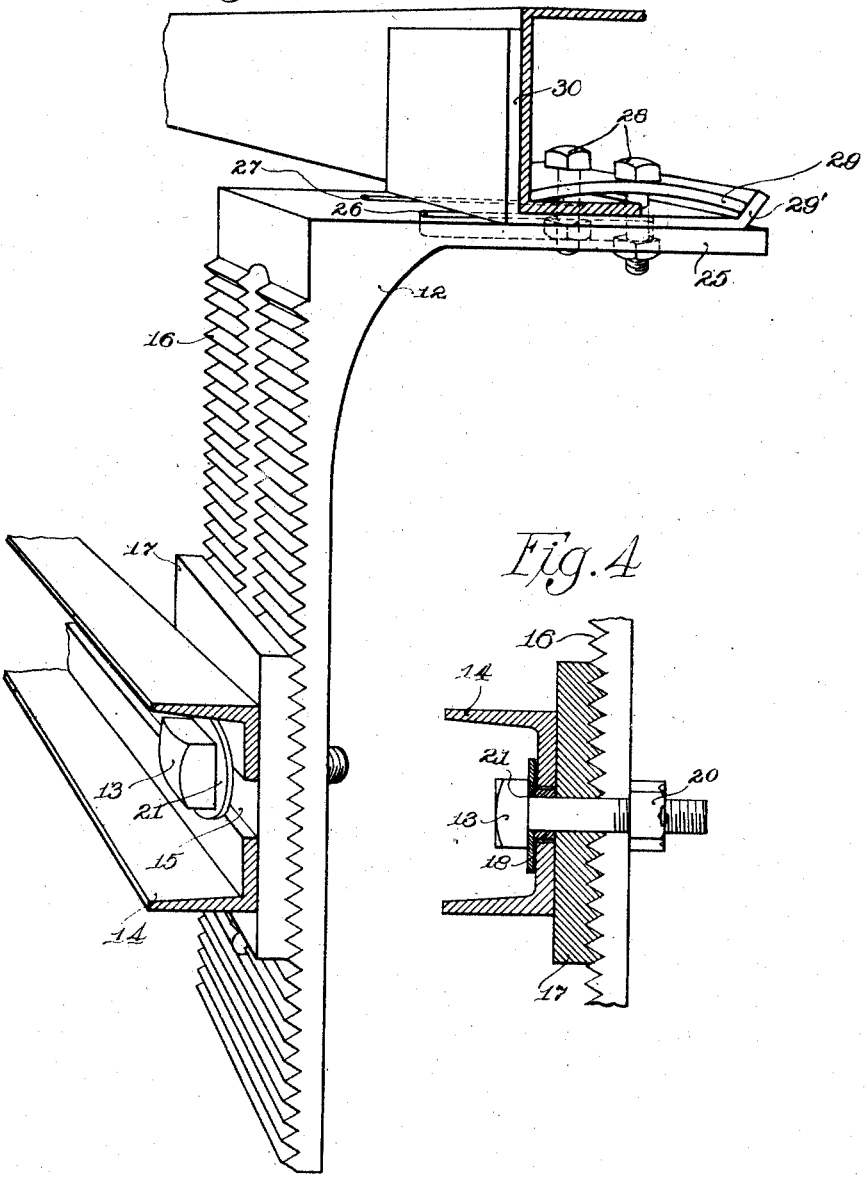

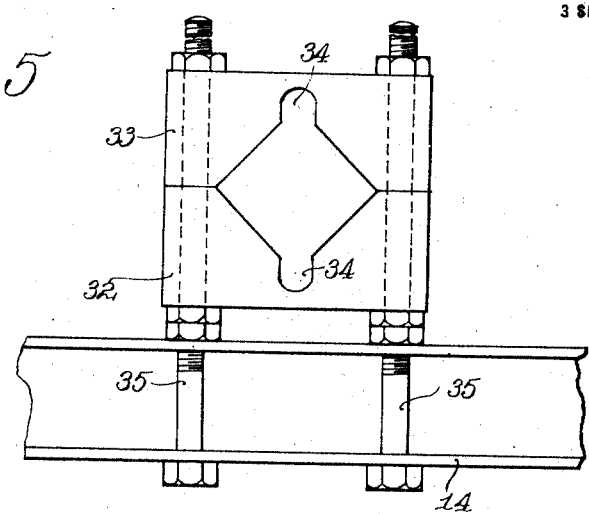
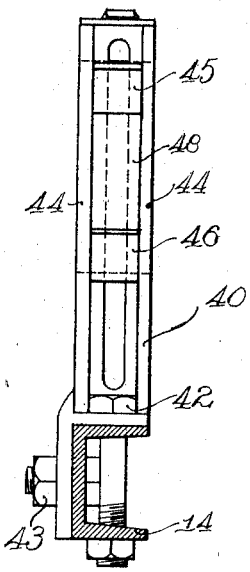
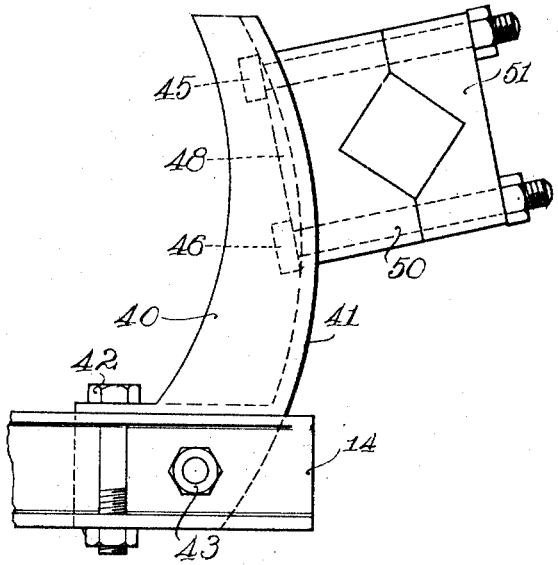

UNITED STATES PATENT OFFICE.

FRANK R. WARD, OF CHICAGO, ILLINOIS, ASSIGNOR, BY MESNE ASSIGNMENTS, TO MAKE-A-TRACTOR CORPORATION OF AMERICA, OF CHICAGO, ILLINOIS, A CORPORATION OF DELAWARE.

TRACTOR ATTACHMENT FOR AUTOMOBILES.

1,366,893.   Specification of Letters Patent.   Patented Jan. 25, 1921.

Application filed September 10, 1917. Serial No. 190,434.

*To all whom it may concern:*

Be it known that I, FRANK R. WARD, a citizen of the United States, residing at Chicago, in the county of Cook and State of Illinois, have invented certain new and useful Improvements in Tractor Attachments for Automobiles, of which the following is a full, clear, concise, and exact description, reference being had to the accompanying drawings, forming a part of this specification.

My invention relates to a universal tractor attachment for automobiles.

The object of my invention is to provide a simple, readily detachable, and universally adjustable mechanism for attachment to automobiles to convert them into tractors. My invention relates particularly to the adjustable features of the structure which permit it to be attached in such a manner as to avoid interference with the brake rods, truss rods, and other subconstructions which vary greatly in distribution for different makes of automobiles.

My invention further relates to the particular method of attaching the brackets to the automobile frames, and to the details of the adjustment whereby the operation of the usual automobile spring suspension will not be interfered with, and whereby the connecting channel may be set at various angles to the horizontal without altering the distance between the pinion carried by the automobile axle and the tractor axle.

My invention is illustrated in the accompanying drawings, in which—

Figure 1 is a plan of an automobile to which a tractor attachment has been connected;

Fig. 2 is an elevation of the same;

Fig. 3 is a perspective of the bracket by means of which various adjustments are had for attaching the forward end of the channel to the automobile frame;

Fig. 4 is a detailed section through the vertical portion of the bracket, illustrating the pivotal arrangement of the channel member with the bracket, Fig. 5 is an elevation of the clamp by means of which the channel is attached to the rear axle housing of the automobile;

Fig. 6 is an elevation of the adjustable carrier for attachment to the axle extending between the tractor wheels; and Fig. 7 is a front view of the carrier illustrated in Fig. 6.

My invention is shown attached to an automobile having the usual frame members 7 and 8 and the usual rear axle housing 9 attached to the frame member by spring construction of any well-known type. The rear axle of an automobile is almost universally pivoted to the frame either through a torsion tube 10, as illustrated herein, or by means of a well-known torsion frame, or by means of the rear springs which lie substantially in line with the side frame members 7 and 8 of the automobile. In any instance the movement of the rear axle with respect to the frame as the springs are compressed and deflected is about an arc of a circle having its center at some point along the line of the frame between the rear end thereof and the rear of the automobile engine.

In order that my tractor attachment may be fastened to various makes of automobiles without dismantling the automobile to a greater extent than the removal of the rear fenders, which is usually necessary, the brackets 12 are preferably so constructed that they may be attached to the frame members 7 and 8 at the most convenient position with respect to the automobile frame, so as, for example, to miss the running board supports, the cross braces which often extend between the side frame members, the intermediate brake operating shafts, which often extend between the side frame members, and any other downwardly projecting or interfering parts of the automobile. It will often be impossible to locate this bracket so that the pivotal bolt 13 will lie in or even substantially in the axis of rotation of the rear axle about its pivotal point with the frame, and I therefore provide a channel member or arm 14 with a slot 15, which, as more clearly illustrated in Figs. 3 and 4, permits a free rotation of the channel 14 about the pivoted bolt 13, as well as permitting the forward and rear movement of the channel in case the pivotal point 13 is not located exactly on the line of center of movement of the rear axle with respect to the automobile frame.

In order that the pivotal bolt 13 may be vertically adjusted with respect to the frame, I provide an externally corrugated surface 16 upon the bracket member 12, and a registering block 17, which latter is provided with a central opening through which the bolt 13 extends, so that the block 17 may be clamped in any desired position of vertical adjustment. The bolt 13 is also provided with a sleeve 18 which has a length slightly greater than the thickness of the back plate of channel 14, whereby the nut 20 may be tightly set without preventing the ready rotation and forward and back movement of the channel or arm 14 with respect to the block 17. A second washer 21 is preferably provided around the bolt 13 so that when wear occurs it can be readily replaced.

Obviously in attaching the channels to various makes of automobiles, it becomes necessary to shift the position of the channels with respect to the frame, either closer or farther away from the vertical line of the frame channels, and in order that this may be readily accomplished, and in order that a very secure attachment may be had to the automobile frame without the necessity of drilling the frame members, the construction shown in the upper part of Fig. 3 is provided. In accordance with this construction the horizontal member 25 of the bracket 12 is provided with a pair of slots 26 and 27 through which a pair of bolts 28 extend. These bolts also extend through the upper plate 29, which is curved as shown, and has its opposite edges engaging the inner lower corner of the channel member and the cam piece 29' provided on the angle member 30. The vertical limb of the angle member 30 lies along the outside of the channel and the horizontal limb beneath the channel. This construction, although simple, makes it possible to hold the bracket tightly to any sized channel, and permits horizontal adjustment of the bracket 12 relatively to the angle member 30 and plate 29.

The clamp illustrated in Fig. 5, by means of which the channel members are attached to the rear axle housing of the automobile comprises a pair of blocks 32 and 33 so shaped as to provide a substantially square opening by means of which axle housing of various shapes will be securely clamped. The members 32 and 33 are provided with channels 34 which will span the flanges of certain makes of housings, in which two halves are attached together with a flange between them. These channels may also be used to span truss rods and the like, which often extend between the rear axle housing from side to side. Lock nuts are provided between the plate 32 and the channel member 14 about the bolts 35, by means of which a slight adjustment may be had between the clamping blocks 32 and 33 and the channel, this being occasionally necessary for the accommodation of truss rods which may be too low to extend within the channels 34 of the blocks.

Various makes of automobiles are provided with different sized rear wheels, which makes it important for a universal attachment to be provided with adjustment for raising and lowering the channel members or arms 14 with respect to the tractor axle.

In order that the tractor axle may in all stages of this adjustment retain a constant distance from the automobile axle, whereby the pinion gear 38 carried on the automobile axle may always properly mesh with the internal gear 39 of the tractor wheels, I provide a standard 40 having a curved face 41, which has its center in the axis of the automobile rear axle. This standard 40 is preferably attached to the channel members by bolts 42 and 43, whereby a rigid construction is provided. The standard is also provided with a pair of flanges 44 between which the squared heads of bolts 45 and 46 ride so that the nuts on the bolts may be adjusted from the rear without danger of the bolts turning. These bolts extend through a baffle plate 48, which has a curved surface fitting the inside of the standard 40 and presenting a face perpendicular to the bolts 45 and 46 for abutment against the bolt heads. These bolts extend through adjustable blocks 50 and 51 having a square opening between them, which is adapted to grip the axle extending between the tractor wheels. The tractor wheels and pinion and the tractor axle form no part of my invention. The pinion 38, however, is preferably provided with an extension which may serve as a brake drum to be operated by the ordinary service or emergency brakes of the automobile. This, however, forms no part of my present invention. The tractor wheels are journaled upon the tractor axle 53 in any suitable manner as by roller bearings, or by plain bearings, if desired. The device for attaching the plow or other object to be drawn by the tractor is preferably fastened to a central position on the axle extending between the tractor wheels, such as illustrated at 54.

By the use of my device an automobile can be very readily converted into a tractor and back into an automobile. The bracket members 12 will be permanently left attached to the automobile and the conversion to or from a traction merely means therefore the removal of the bolts 13 so as to detach the channels or arms 14 from the brackets 12, the detachment of the blocks 52 and 53 from the rear axle housing and the removal of the pinion gears 38 from the axle and replacement of the rear automobile wheels. It is of course unnecessary to replace the rear fenders of such automobiles as can be converted without the removal of the fenders. The fenders, however, may be replaced and removed in a very few minutes.

Although I have shown and described my invention with respect to certain details of construction, it is to be understood that I do not wish to be unduly limited thereto, certain modifications being possible without departing from the spirit or scope of my invention.

What I claim is:

1. The combination with a motor vehicle, of a tractor attachment comprising a pair of horizontally spaced arms, means intermediate the ends of the arms for connecting the arms to the rear axle housing of the vehicle, brackets for connecting the front ends of the arms to the vehicle frame, devices for connecting a supplementary axle to the rear ends of the arms, a pair of tractor wheels mounted on the supplementary axle, and transmission mechanism between the vehicle rear axle and the tractor wheels, said devices being vertically adjustable relatively to the said arms, and along an arc substantially concentric with the vehicle rear axle.

2. The combination with a motor vehicle, of a tractor attachment comprising a pair of horizontally spaced arms pivotally secured to the frame of said vehicle, means intermediate the ends of the arms for connecting the arms to the rear axle housing of the vehicle, brackets for connecting the front ends of the arms to the vehicle frame, devices for connecting a supplementary axle to the rear ends of the arms, a pair of tractor wheels mounted on the axle, and transmission mechanism between the vehicle rear axle and the tractor wheels, each of said devices being vertically adjustable relatively to the said arms.

3. A tractor attachment for automobiles including an arm, one end of which is arranged to be attached to an automobile frame, a clamp carried by the arm and adapted for connection with the rear axle housing of an automobile, an axle, tractor wheels mounted thereon, and devices for connecting the axle to the arm, said devices being adjustable relatively to the arm and along an arc substantially concentric with the clamp.

4. A tractor attachment for automobiles including an arm, means for attaching one end of the arm to an automobile frame, said means being vertically adjustable on the arm, a clamp carried by the arm and adapted for connection with the rear axle housing of an automobile, an axle, tractor wheels mounted thereon, and devices for connecting the axle to the arm, said devices being adjustable relatively to the arm and along an arc substantially concentric with the clamp.

5. A tractor attachment for automobiles comprising a pair of horizontally spaced arms, means at one end of each arm for attaching the arms to an automobile frame to slide longitudinally thereof, said means being vertically adjustable on the arms, an axle mounted on the opposite ends of the arms, tractor wheels carried by the axle, and a clamp on each arm intermediate the axle and the said means adapted for connection with the rear axle housing of an automobile.

6. A tractor attachment for automobiles comprising a pair of horizontally spaced arms, means at one end of each arm for attaching the arms to an automobile frame, said means being vertically adjustable on the arms, an axle mounted on the opposite ends of the arms, tractor wheels carried by the axle, and a clamp on each arm intermediate the axle and the said means adapted for connection with the rear axle housing of an automobile, the axle being vertically adjustable on the arms and along an arc substantially concentric with the clamps.

7. A tractor attachment for automobiles comprising an arm, a clamp adapted for connection with the rear axle housing of an automobile, carried by the arm and disposed intermediate its ends, an axle at one end of the arm, and means at the opposite end of the arm for connecting the arm with a channel iron forming part of the automobile frame, said means comprising a horizontal plate, an angle iron arranged to extend under the channel and against the outer side thereof, a clamping member arranged to engage the inner side of the channel, and devices for connecting the angle iron and clamping member to the said horizontal plate.

8. A tractor attachment for automobiles comprising an arm, a clamp adapted for connection with the rear axle housing of an automobile, carried by the arm and disposed intermediate its ends, an axle at one end of the arm, and means at the opposite end of the arm for connecting the arm with a channel iron forming part of the automobile frame, said means comprising a horizontal plate, an angle iron arranged to extend under the channel and against the outer side thereof, a clamping member arranged to engage the inner side of the channel, and devices for connecting the angle iron and clamping member to the said horizontal plate, the angle iron and clamping member being horizontally adjustable along the horizontal plate to facilitate connection of the tractor to automobiles having frames of different widths.

9. A tractor attachment for automobiles comprising an arm, a clamp adapted for connection with the rear axle housing of an automobile, an axle at one end of the arm, and means at the opposite end of the arm for connecting the arm with a channel iron forming part of the automobile frame, said means comprising a horizontal plate, a clamping member carried by the plate and arranged to engage the outer face of the channel, and a second clamping member carried by the plate and arranged to engage the inner face of the channel.

10. A tractor attachment for automobiles comprising an arm, a clamp carried by the arm and adapted for connection with the rear axle housing of an automobile, an axle at one end of the arm, and means at the opposite end of the arm for connecting the arm with a channel iron forming part of the automobile frame, said means comprising a horizontal support, a clamping member carried by the support and arranged to engage the outer face of the channel, a curved clamping plate arranged to engage the inner face of the channel, and a bolt extending through the curved plate and through the horizontal support for clamping the support to the channel.

11. A tractor attachment for automobiles including an arm, an axle at one end thereof, and means at the opposite end of the arm for connecting the arm to an automobile frame, said means comprising a vertical serrated bracket, a serrated plate interlocking with the bracket, and a bolt extending through the plate and connecting the arm with said plate so as to be slidable relative thereto.

12. A tractor attachment for automobiles including an arm, an axle at one end thereof, and means at the opposite end of the arm for connecting the arm to an automobile frame, said means comprising a vertical serrated bracket provided with a slot, a serrated plate interlocking with the bracket, and means extending through the slot in the bracket, the plate and the arm for slidably and pivotally connecting said arm to said bracket.

13. A tractor attachment for automobiles including an arm, provided with a longitudinal slot, an axle at one end of the arm, and means at the opposite end of the arm for connecting the arm to an automobile frame, said means comprising a serrated bracket provided with a slot, a serrated plate interlocking with the bracket, and a bolt extending through the slot in the bracket, the plate, and the slot in the arm, whereby the arm is pivoted to the bracket and whereby adjustment of the parts is facilitated.

14. A tractor attachment for automobiles comprising an arm, a clamp carried by the arm, and adapted for connection with the rear axle housing of an automobile, an axle at one end of the arm, and means at the opposite end of the arm for connecting the arm with a channel iron forming part of the automobile frame, said means comprising a horizontal support, an angle member carried by the support and having one of its limbs arranged to extend vertically along the outside of the channel and its other limb horizontally beneath the channel, a cam piece at the outer end of the horizontal limb, a curved clamping plate having its opposite edges adapted to engage the cam piece and the inner lower corner of the channel, and a bolt for connecting the curved plate and channel member to the horizontal support and for clamping the support to the channel.

15. An automobile tractor comprising an automobile having a frame having substantially parallel sides, and a tractor attachment having a supplemental shaft, a pair of tractor wheels supporting said shaft below the level of the automobile frame, two bars extending forward from said supplemental shaft parallel to the sides of the automobile frame, and a hanger attached to each side of the automobile frame and having a portion adjustable transversely thereto and extending down to the forward end of the adjacent bar for suspending the latter and holding it substantially horizontally.

16. An automobile tractor comprising an automobile having a frame having substantially parallel sides, and a tractor attachment having a supplemental shaft, a pair of tractor wheels supporting said shaft below the level of the automobile frame, two bars extending forward from said supplemental shaft parallel to the sides of the automobile frame, hangers extending up from the forward end of the respective bars, and clamping means for securing the upper ends of the hangers to the automobile frame for adjustment transversely of the latter, said clamping means being adjustable lengthwise of the automobile frame.

17. An automobile tractor comprising an automobile having a frame having substantially parallel sides, and a tractor attachment having tractor wheels, a shaft for said wheels at the rear end of the automobile frame, two side bars, and two standards, one rising from each side bar for suspending it from the tractor shaft, the side bars extending forward from the shaft parallel to the sides of the automobile frame, said bars terminating at about the middle of the length of the automobile frame, and hangers rising from the forward end of the side bars to the sides of the automobile frame for suspending the forward end of the bars from the frame, the effective length of the hangers and of the standards being variable whereby the side bars and the frame of the automobile both may always be maintained in horizontal position.

18. A structure as specified in claim 17, in which the standards rise from the rear end of the side bars and are suspended from the tractor shaft by journal boxes in the form of brackets attachable to the standards at various elevations thereon.

19. The combination of a motor vehicle having a frame with side members, each side member having both a vertical and a horizontal flange, a tractor attachment having two side members, and a multi-part clamp for connecting each side member of the vehicle frame to the adjacent side member of the tractor attachment, one of the members of each clamp engaging both the horizontal and the vertical portion of the side member of the vehicle frame.

20. The combination of a motor vehicle having a frame with side members, each side member having both a vertical and a horizontal flange, a tractor attachment having two side members, and a three-part clamp on each side member of the tractor attachment for connecting it to the adjacent side member of the vehicle frame, each clamp engaging both the horizontal and the vertical portion of the side member of the vehicle frame, and one of the clamp parts engaging the inside and the other the outside of the side member of the vehicle frame.

21. In combination, with a motor vehicle having channel irons forming the side members of the vehicle frame, of a supplemental axle, tractor wheels on said axle, power connections between said tractor wheels and the motor of the vehicle, a supplemental frame connected to the supplemental axle and means for connecting the supplemental frame to the frame of motor vehicle, said connecting means comprising interfitting L shaped members for engaging both the inside and the outside of the channels of the vehicle frame.

In witness whereof, I hereunto subscribe my name this 7th day of September, A. D. 1917.

FRANK R. WARD.

Witnesses:
  MARY A. COOK,
  CLIFFORD C. BRADBURY.